Patented June 23, 1942

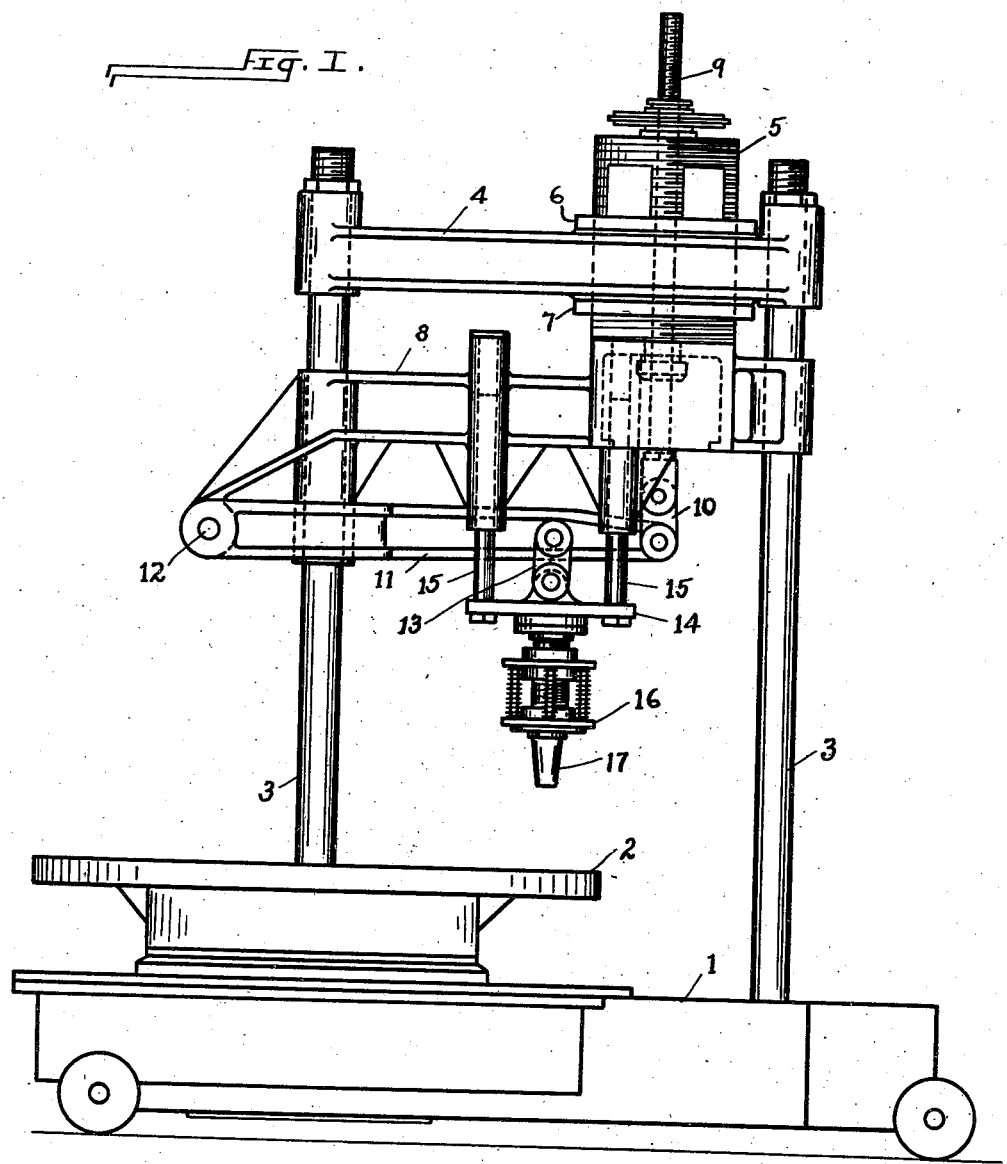

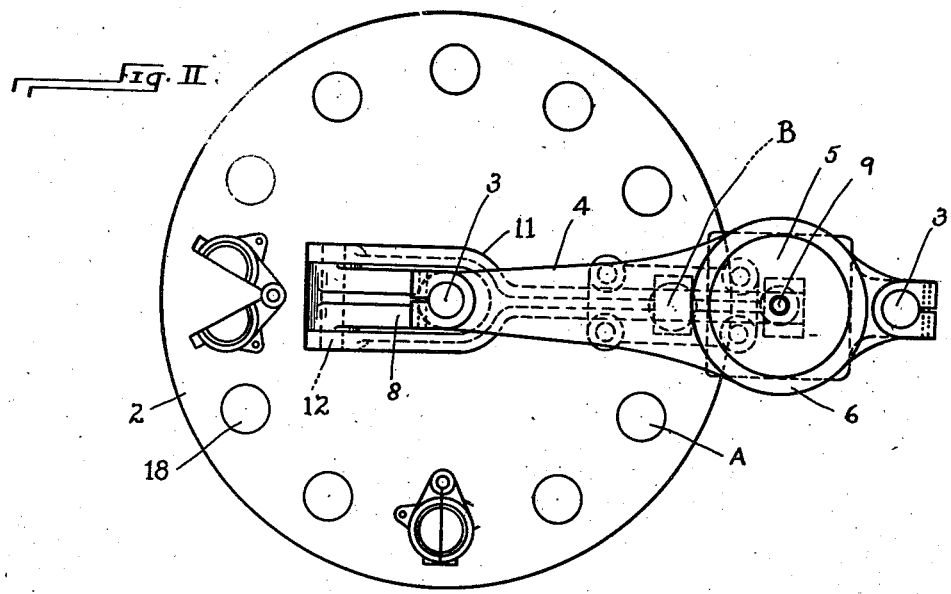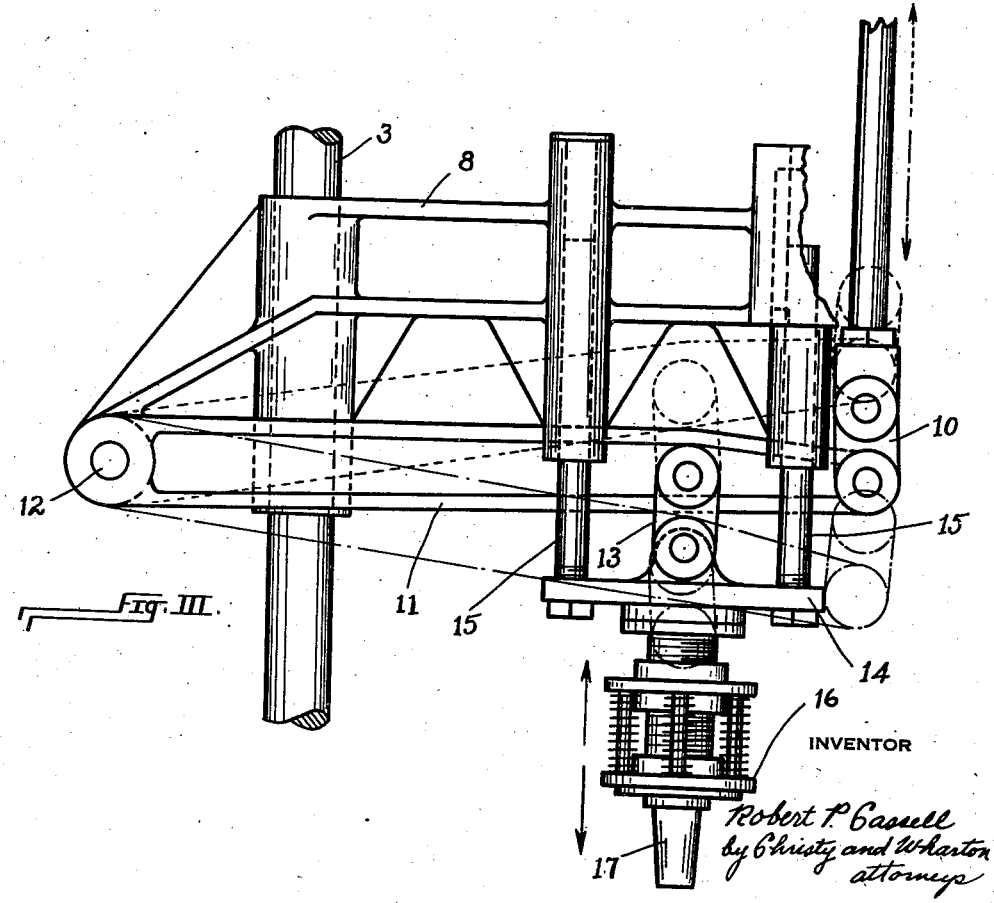

2,287,512

UNITED STATES PATENT OFFICE 2,287,512

GLASS PRESSING APPARATUS

Robert P. Cassell, Jeannette, Pa., assignor to The Jeannette Glass Company, a corporation of Pennsylvania Application July 15, 1939, Serial No. 284,723

6 Claims. (Cl. 49—37)

This invention relates to pressing apparatus for glass objects.

Rotary glass pressing machines consist primarily of a turntable having thereon a plurality of molds; means for automatically feeding mold charges of molten glass to the molds; a plunger arranged to enter the molds to press the charges of glass to form therein; a fluid pressure cylinder mounted and connected to reciprocate the plunger; and timed actuating means constructed and arranged so to rotate the turntable as to bring the molds therein successively into position to receive a charge of molten glass, and to subject the glass therein to the pressing action of the plunger. The rotation of the turntable takes place step-by-step, so that the positions in which successive molds receive a charge of glass, and in which the plunger acts on a charge of glass in a mold, may be considered to be respectively a receiving station and a pressing station. In the usual organization of a glass pressing machine of this sort, other stations angularly spaced around the turntable are successively effective on the molds, as the turntable advances step-by-step, to cool glass objects which have been pressed, to open the molds for the discharge of the pressed objects, and to close the molds for reception of the next charge of glass to be pressed.

In apparatus of that general organization, it has been usual practice so to arrange the fluid pressure cylinder that it acts directly upon a cross-head carrying the forming plunger. A problem then is so to arrange this relatively bulky assembly that it may quickly act upon a charge of glass fed to a mold. This is of importance, because a small body of molten or viscous glass, tends rapidly to lose temperature when in contact with the air or with a body cooler than itself. If the turntable of the pressing apparatus has been made of relatively great diameter with relation to the number of molds which it carries, and is arranged in such manner that the molds are spaced a relatively great distance apart, it has been possible to press in the station next to that in which the feeder delivers a charge of glass to successive molds. Otherwise, if the charge, or gather, of glass is to be dropped directly into a mold, it has been necessary to interpose a blank station between the feeding station and the pressing station.

The latter expedient gives an increased interval for chilling the mold charge which has been delivered to the feeder, and cuts down the production of the machine. In spite of such circumstances, pressing machines are frequently organized in that manner, in order to lessen the size and weight of the turntable, and to increase the ease and smoothness of its operation.

In accordance with my invention, I have so organized a plunger mechanism with the fluid pressure cylinder of a pressing machine that the plunger may operate very close to the feeding station; and for that reason may utilize a turntable of small diameter, provided with a series of closely-spaced molds. The result is that each mold charge of glass is pressed immediately after its delivery to a mold, in the station next adjacent to, and closely spaced with, the feeding station. The structural economy and smooth operation of a relatively small diameter turntable also are obtained.

As an advantage incident to the apparatus of my inventiton, in which additional plunger mounting is associated with the fluid pressure cylinder, an applied pressure of increased effectiveness is obtained from any given order in the fluid pressure cylinder.

In the accompanying drawings Fig. I is an elevational view of glass pressing apparatus; primarily conventional in structure and arrangement, but which includes the pressure-transmitting assembly in the adaptation of which my invention specifically resides. Fig. II is a plan view of the apparatus shown in elevation in Fig. I. Fig. III is a fragmentary elevational view showing the pressure-transmitting assembly apart from the remainder of the apparatus, and illustrating the action of the assembly in pressing.

In the drawings, reference numeral 1 designates the base of the glass-pressing apparatus, and reference numeral 2 designates the mold-carrying table which is rotatable on base 1. From the base 1 there rise columns 3, in the upper region of which there is a fixed cross-member 4, having therein an opening for receiving the exteriorly threaded pressure cylinder 5. Nuts 6 and 7 on the threaded cylinder 5 serve to position it with respect to the fixed cross-member 4. A second cross-member, or bracket, 8 has a sliding engagement with the columns 3 and has a fixed connection with pressure cylinder 5, so that it may be moved with the pressure cylinder in regulating the vertical position of the latter.

In a conventional arrangement of rotary glass-pressing machines of this sort, a pressure cylinder is so mounted on the rigid cross-member that it is equidistant from the supporting columns; and a cross-head, vertically movable on the columns and carrying the pressing plunger, is directly actuated by the piston rod of the pressure cylinder.

As shown in the drawings, the pressure cylinder of my apparatus is mounted close to one of the columns 3, so that its piston rod 9 lies radially beyond a position of vertical alignment with the mold-carrying zone of turntable 2. The piston rod 9 of the pressure cylinder projects through an opening in the bracket 8, and at its lower end the piston rod 9 is squared for the attachment of links 10 by which it is connected with one end of a lever arm 11. This lever arm 11 is relatively long, and at its end opposite that which is connected with the piston rod of the pressure cylinder, it is forked to embrace an extension of the bracket 8 and has with it a pivoted connection 12.

In a position relatively remote from its pivotal connection with bracket 8, the pressure lever 11 is connected by links 13 with a cross-head 14 mounted for vertical movement by posts 15 slidable in sleeves carried by the bracket 8. Cross-head 14 carries a spring plate 16 from which depends the pressing plunger 17. In the organization of the apparatus, plunger 17 is vertically aligned with each of the molds on the turntable as each dwells in the pressing station.

Referring now particularly to Fig. II of the drawings, it will be seen that the turntable 2 therein shown is equipped with twelve molds, some of the molds in this figure of the drawings being diagrammatically indicated merely by the mold-receiving sockets 18 in the turntable. It will also be seen, twelve molds being carried by the turntable, that the diameter of the table and the angular distance between the molds is such as to bring the molds within a relatively short linear distance of each other. The feeding station A is thus close to the pressing station B to which it is next adjacent. It will also be appreciated from a consideration of Fig. II of the drawings that with the relative proportioning between the diameter of the turntable and the number of molds which it carries, it would be impossible to operate a feeder directly to deliver mold charges at station A, if station B had above it the bulky structure of the pressure cylinder and a cross-head of a size and mounting suitable for direct connection to the pressure cylinder.

With the organization shown, a mold charge delivered at the feeding station A is in the next step brought into the pressing station B in which the plunger 17, being forced downwardly into the mold, forms the glass therein. A glass object is thus press-molded at each step of the turntable, and since there are twelve stations in its step-by-step movement, the table may be rotated rapidly while providing ample opportunity for cooling the pressed object in each mold and for successively opening and closing each of the molds in its progress from the pressing station again to the feeding station. As a matter of primary importance, it should be noted that the mold charges of glass are pressed at the station next to that in which they are fed, and the general operation of the machine being rapid, minimized cooling of the glass can take place in the interval between its feeding and its pressing. Also the mold charges may, since the pressure cylinder does not overlie the mold in the feeding station, be directly delivered from an overlying tank opening to the mold. This avoids the chilling of the glass which results from delivering mold charges by way of a chute leading from a tank opening which is offset in the assembly to a mold in the feeding station.

Referring particularly to Fig. I of the drawings, it will be seen that the pressure-transmitting assembly is so organized as to be very sensitive to movement of the piston rod 9. Assuming, therefore, that timing mechanism of conventional sort be utilized to synchronize rotation of the turntable, feeding charges of molten glass to the mold, and the action of the pressure cylinder, this sensitiveness further contributes to the high speed operation of the apparatus, since a relatively short piston movement is adequate to effect the pressing operation. As an incident to this effect, the pressure exerted by the plunger may be made greater than is obtainable from a pressure cylinder and pressure source of the same capacity. In fact I have found it possible to obtain with my organization a pressure approximately 30% greater than is exerted by the plunger of a conventionally organized machine having a pressure cylinder of the same dimensions and receiving pressure from the same source. While the possibility of exerting substantially increased pressure is not of moment in press-molding the usual run of glass objects, it is of substantial advantage in making certain specialized objects, such as deep vases, pitchers, and the like.

My invention, consisting as it does in improvement in a conventionalized and standardized type of apparatus, results in both increased compactness of such apparatus and increased speed in its productive operation, and so relates the speed of operation of the apparatus to its structural arrangement, that each mold charge of glass is delivered and pressed in such manner as to avoid substantial loss of temperature in the interval between the formation of each mold charge of glass and its pressing into a formed glass object. Numerous changes may be made in the form and arrangement of the structure, which I apply as an improvement to such machine, without going beyond the ambit of my invention as defined in the appended claims.

I claim as my invention:

1. In glass-pressing apparatus the combination with a rotatable mold-carrying table, and a pressing plunger vertically in line with the path followed by molds on said table, of means for mounting and actuating the said pressing plunger comprising a fixed frame structure extended upwardly of the table, a fluid-pressure cylinder having a piston and piston rod mounted for vertical adjustment in said fixed frame structure and out of line with the path followed by the molds in movement of the table, a mounting structure carried by the said fluid-pressure cylinder for vertical adjustment therewith, a plunger-carrying member mounted on said vertically adjustable mounting structure and arranged for independent vertical movement toward and from the mold-carrying table, and mechanical connections indirectly connecting the said plunger-carrying member with the piston rod of the fluid-pressure cylinder and arranged to produce movement of said plunger-carrying member by movement of said piston rod.

2. In glass-pressing apparatus the combination with a rotatable, mold-carrying table, and a pressing plunger vertically in line with the path followed by the molds on said table, of means for mounting and actuating the said pressing plunger comprising a fixed frame structure extended upwardly of the table, a fluid-pressure cylinder having a piston and piston rod mounted for vertical adjustment in said fixed frame structure and out of line with the path followed by the molds in movement of the table, a mounting structure carried by the said fluid-pressure cylinder for vertical adjustment therewith, a plunger-carrying member mounted on said vertically adjustable mounting structure and arranged for independent vertical movement toward and from the mold-carrying table, cooperative guides on said vertically adjustable mounting structure and said vertically movable plunger-carrying member organized to impose straight-line movement on the plunger-carrying member, and mechanical connections indirectly connecting the said plunger-carrying member with the piston rod of the fluid-pressure cylinder and arranged to produce movement of said plunger-carrying member by movement of said piston rod.

3. In glass-pressing apparatus the combination with a rotatable mold-carrying table, and a pressing plunger vertically in line with the path followed by molds on said table, of means for mounting and actuating the said pressing plunger comprising a fixed frame structure extended upwardly of the table, a fluid-pressure cylinder having a piston and piston rod mounted for vertical adjustment in said fixed frame structure and out of line with the path followed by the molds in movement of the table, a mounting structure carried by the said fluid-pressure cylinder for vertical adjustment therewith, a plunger-carrying member mounted on said vertically adjustable mounting structure and arranged for independent vertical straight-line movement toward and from the mold-carrying table, a lever mounted for angular movement on the said mounting structure in a position remote from the fluid-pressure cylinder and the mounting of said plunger-carrying member to travel a relatively great linear distance in those locations for any angular movement of said lever, link connection between the piston rod of the said fluid-pressure cylinder and the said lever, and link connection between the said lever and the said plunger-carrying member.

4. In glass-pressing apparatus the combination with a rotatable mold-carrying table of a fixed frame structure extended upwardly of the table; and an assembly adjustable as a unit in the said fixed frame structure toward and from the said table comprising a fluid-pressure cylinder out of line with the path followed by molds on the said table and having a piston and piston rod, a movable mounting structure, a pressing-plunger and plunger-carrying member mounted on said mounting structure and arranged to have independent straight-line movement toward and from the path followed by molds on the said table, and mechanical connections indirectly connecting the said plunger-carrying member with the piston rod of the fluid-pressure cylinder and arranged to produce movement of said plunger-carrying member by movement of said piston rod.

5. In glass-pressing apparatus comprising a rotatable mold-carrying table, a fixed frame structure extended upwardly of the table, a fluid-pressure cylinder having a piston and piston rod mounted in the said fixed frame structure out of line with the path followed by molds on said mold-carrying table, a mounting frame and a vertically movable plunger-carrying member thereon having cooperative guides organized to impose on said plunger-carrying member straight-line movement toward and from the mold-carrying table, a lever pivoted on said mounting frame remotely from the fluid-pressure cylinder and the mounting of said plunger-carrying member to travel a relatively great linear distance in those locations for any angular movement of the said lever, and link connections between the piston rod of said fluid-pressure cylinder and said lever and between said lever and said plunger-carrying member.

6. In glass-pressing apparatus the combination with a rotatable mold-carrying table of a fixed frame structure extended upwardly of the table; and an assembly adjustable as a unit in the said fixed frame structure toward and from the said table comprising a fluid-pressure cylinder out of line with the path followed by molds on the said table and having a piston and piston rod, a movable mounting structure, a pressing-plunger and plunger-carrying member mounted on said mounting structure for independent straight-line movement toward and from the path followed by molds on the said table, a lever pivoted on said mounting structure remotely from the fluid-pressure cylinder and the mounting of said plunger-carrying member to travel a relatively great linear distance in those locations for any angular movement of the said lever, and link connections between the piston rod of said fluid-pressure cylinder and said lever and between said lever and said plunger-carrying member.

ROBERT P. CASSELL.

CERTIFICATE OF CORRECTION.

Patent No. 2,287,512.  June 23, 1942.

ROBERT P. CASSELL.

It is hereby certified that error appears in the printed specification of the above numbered patent requiring correction as follows: Page 2, second column, line 45, beginning with "1. In glass-pressing apparatus" strike out all to and including the word and period "member." on page 3, second column, line 51, comprising claims 1 to 6 inclusive, and insert instead the following --

1. In glass-pressing apparatus the combination with a rotatable, mold-carrying table, and a pressing plunger vertically in line with the path followed by molds on said table, of means for mounting and actuating the said pressing plunger comprising a fixed frame structure extended upwardly of the table, a fluid-pressure cylinder having a piston and piston rod mounted for vertical adjustment in said fixed frame structure and out of line with the path followed by the molds in movement of the table, a mounting structure carried by the said fluid-pressure cylinder for vertical adjustment therewith, a plunger-carrying member, means suspending the said plunger-carrying member from the said mounting structure for independent vertical movement relative to said structure, and mechanical connections indirectly connecting the said plunger-carrying member with the piston rod of the fluid-pressure cylinder and arranged to produce movement of said plunger-carrying member by movement of said piston rod.

2. In glass-pressing apparatus the combination with a rotatable, mold-carrying table, and a pressing plunger vertically in line with the path followed by molds on said table, of means for mounting and actuating the said pressing plunger comprising a fixed frame structure extended upwardly of the table, a fluid-pressure cylinder having a piston and piston rod mounted for vertical adjustment in said fixed frame structure and out of line with the path followed by the molds in movement of the table, a mounting structure carried by the said fluid-pressure cylinder for vertical adjustment therewith, a plunger-carrying member arranged for vertical straight-line movement relative to the mounting structure toward and from the mold-carrying table, a lever pivoted to the mounting structure at a point remote from the locations of the fluid-pressure cylinder and the plunger-carrying member, link connection between the piston rod of the said fluid-pressure cylinder and the said lever, and link connection between the said lever and the said plunger-carrying member.

3. In glass-pressing apparatus the combination with a rotatable, mold-carrying table, and a pressing plunger vertically in line with the path followed by molds on said table, of means for mounting and actuating the said pressing plunger comprising a fixed frame structure extended upwardly of the table, a supporting and operating assembly comprising a fluid-pressure cylinder having a piston and piston rod out of line with the path followed by the molds in movement of the table and a cross-frame fixed to the said pressure cylinder, the said assembly being adjustable as a unitary structure on the said fixed frame, a plunger-carrying member carried by the said supporting assembly for independent vertical movement relative to the cross-frame thereof, cooperative guides on the cross-frame of the supporting and operating assembly and on the said plunger-carrying member organized to impose vertical straight-line movement on the plunger-carrying member, and mechanical connections indirectly connecting the said plunger-carrying member with the piston rod of the said fluid-pressure cylinder and arranged to produce movement of the said plunger-carrying member by movement of said piston rod.

4. In glass-pressing apparatus the combination with a rotatable, mold-carrying table, and a pressing plunger vertically in line with the path followed by molds on said table, of means for mounting and actuating the said pressing plunger comprising a fixed frame structure extended upwardly of the table, a supporting and operating assembly comprising a fluid-pressure cylinder having a piston and piston rod out of line with the path followed by the molds in movement of the table and a cross-frame fixed to the said pressure cylinder, the said assembly being adjustable as a unitary structure on the said fixed frame, a plunger-carrying member carried by the said supporting and operating assembly for independent vertical movement relative to the cross-frame thereof, a lever pivoted to the said cross-frame at a point remote from the locations of the fluid-pressure cylinder and the plunger-carrying member, link connection between the piston rod of the said fluid-pressure cylinder and the said lever, and link connection between the said lever and the said plunger-carrying member.

5. In glass-pressing apparatus the combination with a rotatable, mold-carrying table, and a pressing plunger vertically in line with the path followed by molds on said table, of means for mounting and actuating the said pressing plunger comprising a fixed frame structure extended upwardly of the table, a supporting and operating unit comprising a fluid-pressure cylinder having a piston and piston rod and a mounting structure, said unit being mounted for vertical adjustment in said fixed frame structure, the said cylinder being out of line with the path followed by the molds in movement of the table, a plunger-carrying member, and means movably supporting the plunger-carrying member from the supporting and operating unit, said means including mechanical connections with the piston rod of the fluid-pressure cylinder arranged to produce movement of said plunger-carrying member by movement of said piston rod.

6. In glass-pressing apparatus the combination with a rotatable, mold-carrying table, and a pressing plunger vertically in line with the path followed by molds on said table, of means for mounting and actuating the said pressing plunger comprising a fixed frame structure extended upwardly of the table, a fluid-pressure cylinder having a piston and piston rod mounted for vertical adjustment in said fixed frame structure and out of line with the path followed by the molds in movement of the table, a mounting structure carried by the said fluid-pressure cylinder for vertical adjustment therewith and including a cross frame, a plunger-carrying member, means suspending the said plunger-carrying member from the said mounting structure for independent vertical movement relative to said structure, cooperative guides on the cross-frame of the supporting assembly and on the said plunger-carrying member organized to impose vertical straight-line movement on the plunger-carrying member, and mechanical connections indirectly connecting the said plunger-carrying member with the piston rod of the fluid-pressure cylinder and arranged to produce movement of said plunger-carrying member by movement of said piston rod. --;

and that the said Letters Patent should be read with this correction therein that the same may conform to the record of the case in the Patent Office.
Signed and sealed this 13th day of October, A. D. 1942.

(Seal)

Henry Van Arsdale,
Acting Commissioner of Patents.